(12) United States Patent
Readler

(10) Patent No.: US 6,768,428 B1
(45) Date of Patent: Jul. 27, 2004

(54) COMPUTER KEYBOARD LOCK

(76) Inventor: Blaine C. Readler, 11320 Florindo Rd., San Diego, CA (US) 92127

( * ) Notice: Subject to any disclaimer, the term of this patent is extended or adjusted under 35 U.S.C. 154(b) by 248 days.

(21) Appl. No.: 10/109,242

(22) Filed: Mar. 27, 2002

(51) Int. Cl.[7] ............................................... H03K 17/94
(52) U.S. Cl. ....................... 341/26; 341/20; 340/5.51; 340/825.5; 340/825.56; 708/142
(58) Field of Search ............................. 341/23, 22, 26; 708/142; 455/565; 340/825.5, 825.56

(56) References Cited

U.S. PATENT DOCUMENTS

| | | | | |
|---|---|---|---|---|
| 3,703,987 A | | 11/1972 | Kazuhiko .................... 235/26 |
| 3,906,814 A | | 9/1975 | Magnussen ................... 74/483 |
| 4,670,747 A | * | 6/1987 | Borras et al. .......... 340/825.56 |
| 4,827,440 A | | 5/1989 | Wathor ....................... 708/142 |
| 5,065,155 A | * | 11/1991 | Oogita et al. .......... 340/825.56 |
| 5,241,583 A | * | 8/1993 | Martensson ................. 455/565 |
| 5,805,084 A | * | 9/1998 | Mannisto .................... 341/22 |
| 6,056,193 A | | 5/2000 | McAuliffe .................. 235/380 |
| 6,111,518 A | * | 8/2000 | Han ...................... 340/825.56 |
| 6,583,714 B1 | * | 6/2003 | Gabou et al. .............. 340/5.54 |

* cited by examiner

*Primary Examiner*—Albert K. Wong

(57) ABSTRACT

Method and apparatus for disabling the operation of a computer keyboard with respect to depressed keys as they are observed by the computer's CPU. Entry into, and exit from, the keyboard disabled state is made via specific, simultaneous combinations of depressed keys. In one embodiment of the invention a new software routing (31) is added to the existing keyboard software (12) to recognize specific, simultaneous combinations of depressed keys and alternately inhibit or allow transmissions from the keyboard to the computer CPU in response to depressed keyboard keys. In an alternate embodiment an apparatus (100) is added between an existing keyboard and the computer to similarly recognize specific, simultaneous combinations of depressed keys via a lock detection function (111) which alternately inhibits or allows transmission of keyboard clock (122) and data (123) signals, thus preventing depressed keyboard keys from being recognized by the computer CPU.

10 Claims, 11 Drawing Sheets

Key Lock Detection

Keyboard Disable

COMPUTER KEYBOARD LOCK

CROSS-REFERENCE TO RELATED APPLICATIONS

Not Applicable.

SEQUENCE LISTING

Not Applicable

BACKGROUND

1. Field of Invention

This invention relates to computers and computer keyboards, and specifically to methods for disabling keyboard operations.

2. Description of Prior Art

The ability to disable the operation of the keys of a computer keyboard would be appreciated by any computer user who owns a cat or has small children, both of which could cause unwelcome entries into the computer should they inadvertently depress keyboard keys while the operator momentarily stepped away. Additionally, it would be useful to disable the keyboard key operation when one wished to clean the keyboard or place a large book on the desk with the possibility that the book would again inadvertently depress keyboard keys.

Unplugging the cable between the keyboard and computer is cumbersome, and in any case can cause the computer's operating system to declare a fault condition. Mechanical means have been proposed for locking keyboard keys—for example, U.S. Pat. Nos. 3,703,987 and 3,906,814 both describe mechanical means to lock the operation of keyboard keys. However, both of these methods would be difficult to apply simultaneously to all one hundred or more keys of a typical computer keyboard, and also are not appropriate for the membrane or Hall effect keying means used in most popular computer keyboards.

Some computer operating systems, e.g., Microsoft's NT, allow the user to log off, rendering the computer unusable until the user logs back on using a special password. Although this would effectively achieve the goal of disabling the computer keyboard, it has several distinct disadvantages: 1) not all operating systems accommodate this, 2) logging off and logging back on require a number of user steps that would be inconvenient when stepping away for only few moments, 3) the keyboard is not truly disabled and depressed keys are still recognized by the computer's operating system, thus since most logon systems allow only a limited amount of tries, random depressing of keyboard keys when logged off could potentially result in the operating system observing multiple, unsuccessful logon attempts which would cause the operating system to retreat to a secure condition, causing the user difficulty in re-enabling the computer.

A software-based method is described in U.S. Pat. No. 4,827,440 which includes keyboard lock-out means that is implemented via the computer's CPU directly. This method involves operating system-level software routines that filter selected keys from being passed on to the computer's CPU. The method described in this patent is targeted for a more long-term application use of the computer and has several disadvantages with regard to the goals of the present invention: 1) programming and activating the method described in U.S. Pat. No. 4,827,440 involves many steps which would be overly burdensome to a user who wishes to de-activate the computer for only a few minutes; indeed, activation of the lockout processes as described in the patent would likely require resetting the computer—clearly counter to the more casual "on the fly" goal of the current invention, 2) since the method of U.S. Pat. No. 4,827,440 involves software routines embedded at the operating system level, it would be difficult or impossible to incorporate into a user's existing computer system, 3) as described in U.S. Pat. No. 4,827,440, some keys cannot be locked out at all.

An all-electronic method independent of the computer CPU would serve the purpose better. U.S. Pat. No. 6,056,193 describes an integral encoded device reader, such as a card reader, which can be used to validate and enable keyboard-based operations. Such a mechanism could be extended to include all keyboard operation, thus achieving the desired goal of de-activating the keyboard, however, such a method adds considerable cost to the keyboard, is not compatible with the significant manufacturing investment in commonly accepted keyboard form-factors, and adds inconvenience to the computer user who would now need to keep track of an additional piece of computer hardware, e.g., a magnetically encoded plastic card.

What is needed is a simple, inexpensive means to disable computer keyboards that is easily compatible with current manufactured keyboard forms.

SUMMARY OF THE INVENTION

Therefore, in accordance with the present invention a method for temporarily disabling the operation of a computer keyboard uses the simultaneous depression of a multiple of existing keyboard keys to effect the disabling. Alternatively, a disabling mechanism can be placed in a keyboard extension cable, thus allowing introduction of the inventive feature to current keyboards. The inventive method recognizes the multiple, simultaneous depression of keyboard keys and inhibits further communication of depressed keys to the computer, thus effectively disabling the keyboard. An additional depression of a multiple of keyboard keys then re-enables keyboard operation.

OBJECTS AND ADVANTAGES

Accordingly, several objects and advantages of the present invention are:

a) to provide a method for disabling a computer keyboard that is inexpensive, b) to provide a keyboard disabling method that is simple to use, c) to provide a keyboard disabling method that is compatible with existing keyboard manufacturing forms, d) to provide an alternate keyboard disabling method that is compatible with, and requires no modifications of, existing keyboards.

DETAILED DESCRIPTION OF THE INVENTION

Figure 1:
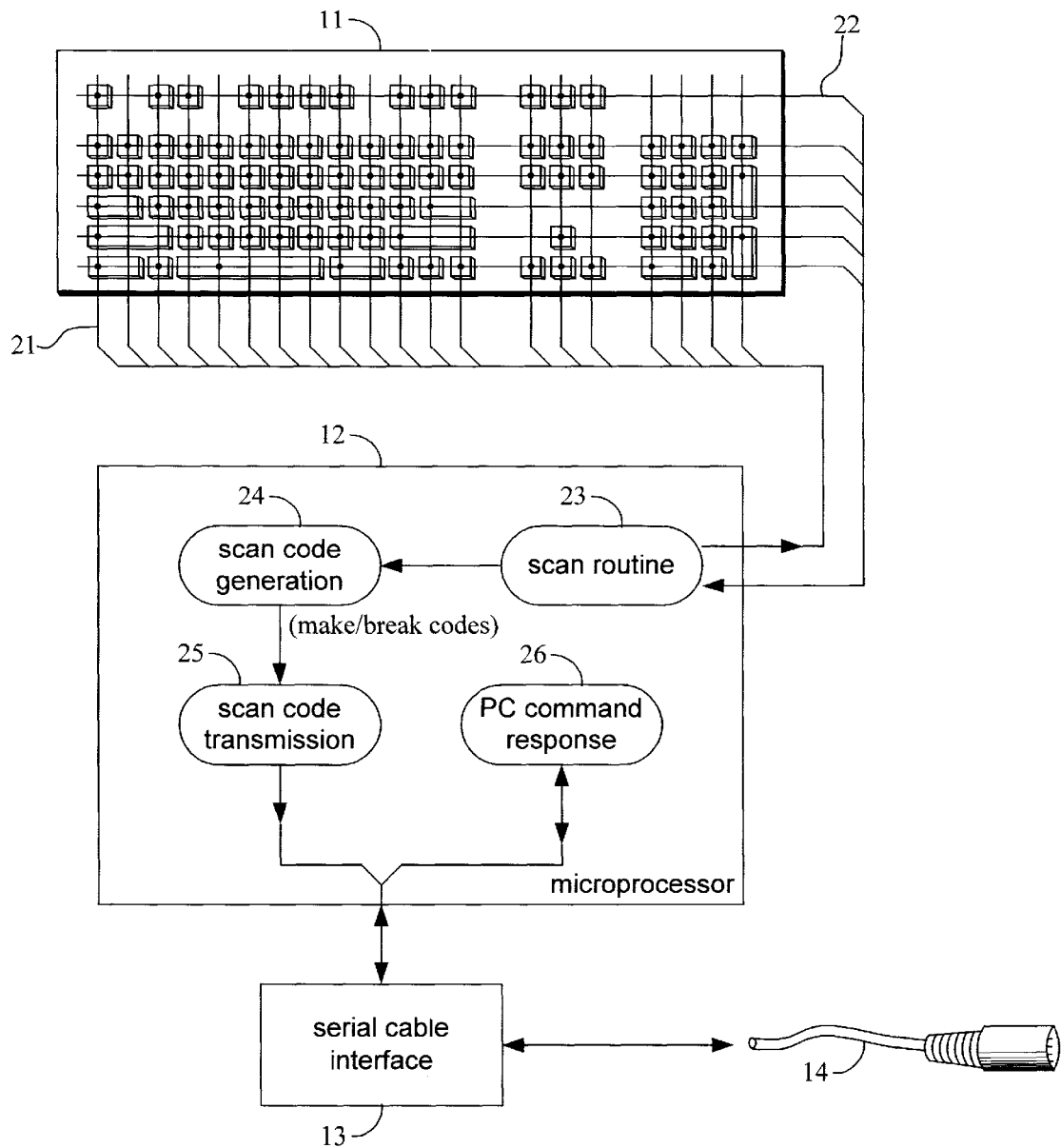
FIG. 1 shows the common operation of a computer keyboard.

Keyboard Operation, FIG. 1

FIG. 1 shows a simplified view of the operation of a typical computer keyboard such as might be provided with an IBM compatible PC. Software routines 23, 24, 25 and 26 represent a subset of the functions performed by keyboard microprocessor 12. These functions, although included in virtually all microprocessor-based keyboards, may not necessarily be implemented as individual discrete sub-programs of the microprocessor code, but are shown here as discrete functions for clarity of explanation. Keyboard 11 contains keys, e.g., 20, which correspond to individual characters that a user might wish to communicate to an attached computer (not shown) via cable 14. Keyboard microprocessor 12, for example a Zilog Z8615, integrated into the housing of the keyboard is connected to vertical column scan lines, e.g., 21, and horizontal row scan lines, e.g., 22, by which it can discern which, if any, keys are being depressed. The keyboard microprocessor does this via scan routine 23 which periodically holds one of the column scan lines at a low level while holding all others column scan lines at a high level. The scan routine then observes all the row scan lines to determine if any keys in that column are depressed since a depressed key on the tested column would result in its associated row scan line being also low. By holding each column scan line low one at a time, the scan routine can determine which, if any, keyboard keys are depressed. The reader should note that by this same process the scan routine can detect and distinguish between multiple, simultaneous depressed keys.

Results of the scanned keys are passed from the scan routine to scan code generation routine 24. Scan code generation routine 24 creates an individual code value for each key that is depressed. These code values are represented as hexadecimal words ranging typically from one to six or more bytes and are defined within standardized code sets, e.g., code sets "1", "2", and "3" for the IBM PC/XT family of computers. In addition to a code value associated with a key being depressed, referred to as a "make" code, the scan code generation routine also creates a code value when the key is lifted; these are referred to as "break" codes.

The scan code transmission routine 25 then outputs the make and break codes in a serial form appropriate for the attached PC to the external serial cable interface 13, which in turn outputs the serial signal onto the keyboard/PC cable 14.

Although the majority of communications between the keyboard and PC are sourced by the keyboard and consist of keyboard character information, the PC can initiate communications of information from the PC to the keyboard across cable 14. These communications consist of PC commands such as "Reset", "Resend", and various configuration types of information. Keyboard microprocessor routine 26 handles these PC commands which include necessary responses from the keyboard back to the PC.

Figure 2:
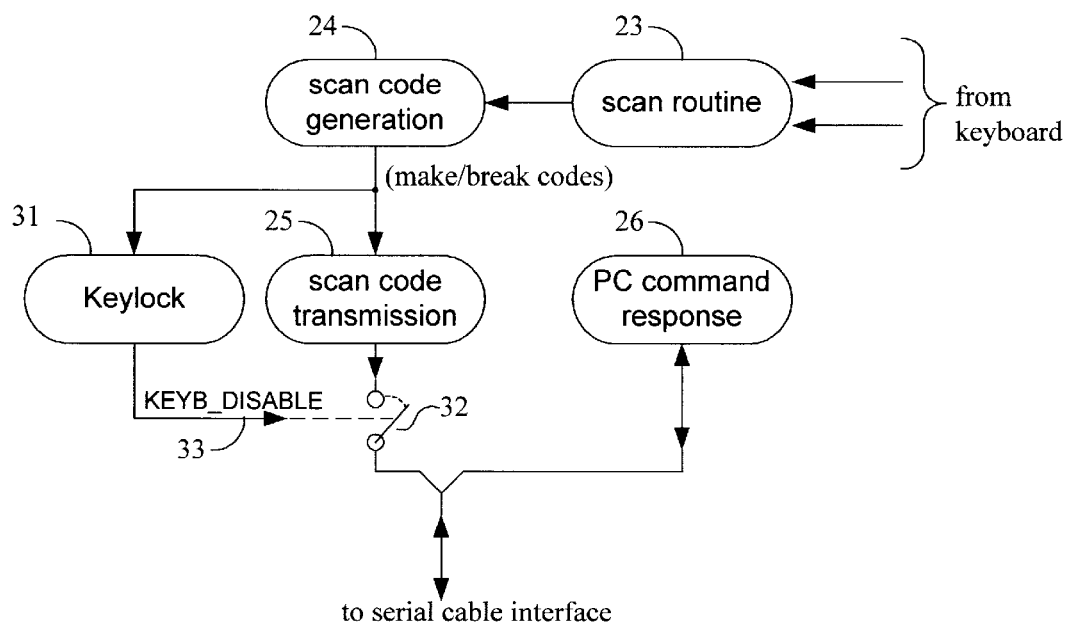
FIG. 2 shows the keyboard microprocessor operation with an added first embodiment of the keyboard disable/enable function.

Keyboard Lock Function, FIG. 2

FIG. 2 shows the software routines of keyboard microprocessor 12 of FIG. 1, now with the addition of a first preferred embodiment of the invention. Key Lock routine 31 monitors the scan codes generated by scan code generation routine 24 in parallel with scan code transmission routine 25. When Key Lock routine 31 observes scan codes indicating that a particular combination of keys, for example, a combination of the 'Ctrl', 'Alt', and 'Backspace' keys, are simultaneously depressed it disables scan code transmissions to the PC's central processing unit via KEYB_DISABLE control signal 33 and switch 32. Switch 32 shown in FIG. 2 symbolically represents an interception of the scan codes output by the scan code generation routine by Key Lock routine 31, all implemented via software code, and should not be construed necessarily as an actual physical switch device.

Although the keyboard/PC communications are disabled between the scan code transmission function and the PC's central processing unit, communications between the PC and the PC command response routine are left enabled. This is necessary since the keyboard must be able to continue to respond to PC commands otherwise the PC's operating system may declare that the keyboard is absent or non-functional and enter a catastrophic handling mode.

Figure 3:
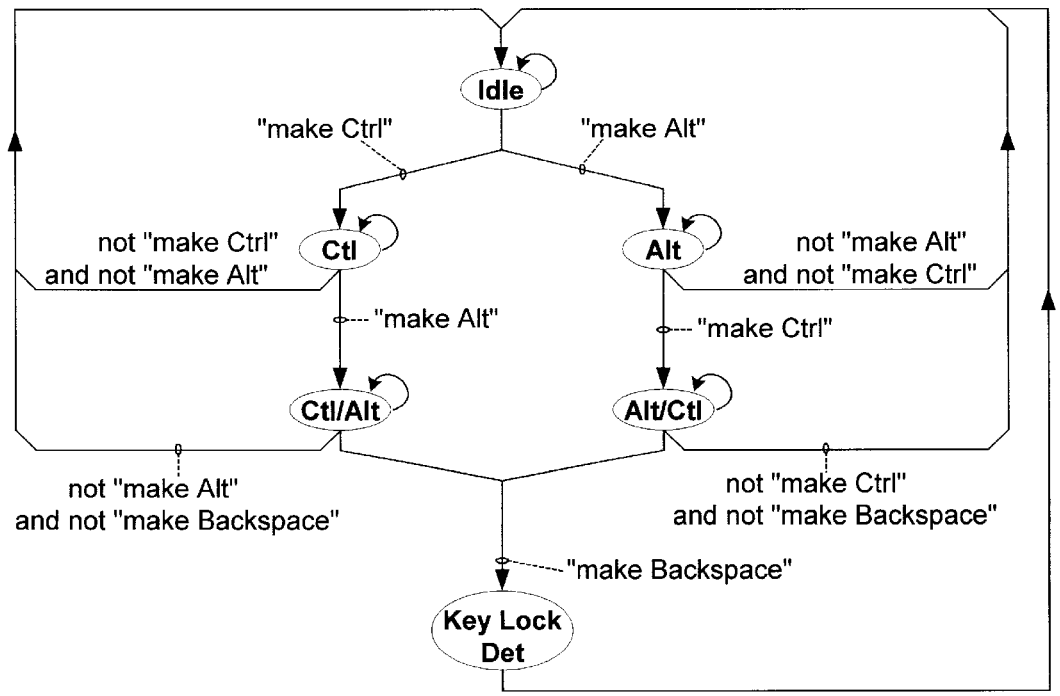
FIG. 3 shows a state flow diagram of the first embodiment of the keyboard disable/enable function.
Figure 3:
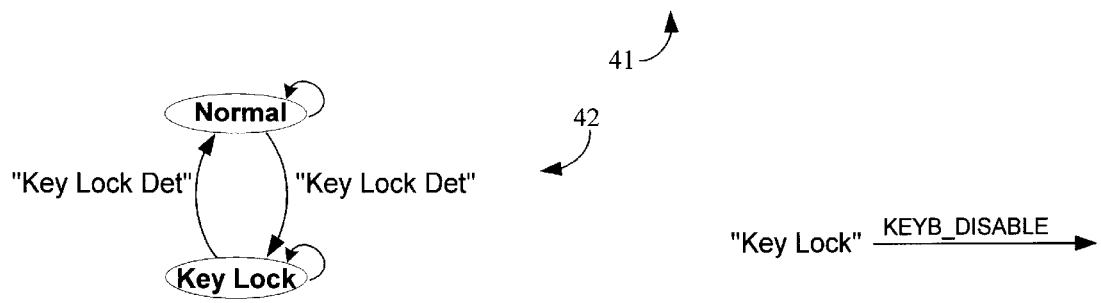

Key Lock State Flow Diagram, FIG. 3

FIG. 3 shows state flow diagrams of Key Lock routine 31 shown in the previous FIG. 2. These diagrams, along with other state flow diagrams that will be encountered in later figures, represent the operation of logic state machines as are commonly used in digital design and will be familiar to one skilled in the art.

This preferred embodiment implementation uses the combination of the 'Ctrl', 'Alt', and 'Backspace' keys in simultaneous combination as an indication that the user wishes to disable or re-enable the keyboard. Before analyzing the operation of Key Lock Detection state diagram 41 it should be noted that due to the layout of the standard computer 'qwerty' keyboard a user would tend to first depress the 'Ctrl' and 'Alt' keys with the left hand, and then depress the 'Backspace' key with the right hand. In fact, for the sake of clarity of illustration this embodiment would require that the user depress the 'Ctrl' and 'Alt' keys, in either order, before depressing the 'Backspace' key. One skilled in the art will recognize that the principles shown in the Key Lock Detection state diagram could be expanded to include a first depression of the 'Backspace' key as well.

Before describing the operation of the Key Lock state machines, some basic operations of the scan code generation routine of the previous FIG. 1 are also presented. The scan code generation routine operates such that the 'make' code for a depressed key will continue to be generated as long as that key is held depressed. Also, should a second key be made depressed while the first is continued to be held depressed, then the scan code generation routine will now generate only the second key's 'make' scan code. If a third key is depressed while the first two are held depressed only its scan code is generated, etc. Should, for example, the first or second keys be lifted while the other two are continued to be held depressed, then the scan code generation routine will issue a 'break' code for the lifted key momentarily, then will revert back to continuously generating the 'make' code for the last key depressed.

A description of Key Lock Detection state flow diagram 41 of FIG. 3 will now be described. After a period of use of the keyboard when neither the 'Ctrl' nor the 'Alt' keys have been used Key Lock Detection State Machine 41 will reside in the 'Idle' state. A user wishing to disable the keyboard will first depress the 'Ctrl' and 'Alt' keys. As the user depresses these two keys, one or the other will likely make contact slightly before the other. Taking first the case where the 'Ctrl' key is depressed, Key Lock Detection State Machine 41 will transition to the 'Ctl' state as the "make Ctrl" code is presented by scan code generation routine 24 of the previous FIG. 2. Key Lock Detection State Machine 41 remains in the 'Ctl' state as long as no other keys other than the 'Ctrl' or 'Alt' keys are depressed. Should any other key be depressed, resulting in a 'make' code for that key, or should the 'Ctrl' key be lifted resulting in its 'break' code, then Key Lock Detection State Machine 41 will transition back to the 'Idle' state. If, on the other hand, the next key detected by the scan code generation routine as depressed is the 'Alt' key, then Key Lock Detection State Machine 41 will transition to the 'Ctl/Alt' state. In a similar fashion as the previous state, any action by the user other than a next depression of the 'Backspace' key while both the 'Ctrl' and 'Alt' keys are held depressed will cause Key Lock Detection State Machine 41 to transition back to the 'Idle' state, while an added depression of the 'Backspace' key results in the state machine transitioning to the 'Key Lock Detect' state. Key Lock Detection State Machine 41 then remains in the 'Key Lock Detect' state only one clock period, then automatically transitions back to the 'Idle' state. The reader should note that now the scan code generation routine is continuously presenting the 'make Backspace' code so Key Lock Detection State Machine 41 does not leave the 'Idle' state. As will be seen in a following paragraph, the passage through the 'Key Lock Detect' state represents a recognition of a successful application by the user of the keyboard lock toggle directive.

Should the 'Alt' key make contact before the 'Ctrl' key when the user begins the keyboard disable toggling directive then Key Lock Detection State Machine 41 will transition to the 'Alt' state. From here Key Lock Detection State Machine 41 will either transition progressively through the 'Alt/Ctl' and 'Key Lock Det' states or back to the 'Idle' state in an analogous manner as was described in the previous paragraph, so these details are not presented here. Further, one skilled in the art will recognize that additional parallel state machine paths could be added in an analogous fashion to accommodate a first depression of the 'Backspace' key, e.g., a path that includes a 'Backspace' to 'Ctrl' to 'Key Lock' progression, a path that includes a 'Backspace' to 'Alt' to 'Key Lock' progression, etc. Finally, should the user depress multiple keys actually simultaneously, i.e., multiple keys make contact between sampling operations of the scan routine of the previous FIG. 2, then scan code generation routine 24 of FIG. 2 operates such that it will momentarily present 'make' codes for each of the multiply depressed keys, until finally presenting the last one continuously. In this case it can be seen that Key Lock Detection State Machine 41 will successfully progress through to the 'Key Lock Det' state and back to the 'Idle' state.

Keyboard Disable state machine 42 of FIG. 3 determines whether the keyboard is in an enabled or disabled mode. After power is initially applied and the keyboard's internal reset forces Keyboard Disable state machine 42 to the 'Normal' state, the keyboard is enabled for normal operation. If Key Lock Detection State Machine 41, described in the previous paragraph, transitions through its 'Key Lock Det' state Keyboard Disable state machine 42 transitions to the 'Key Lock' state. In the 'Key Lock' state the KEYB__DISABLE signal is made active, and from the previous FIG. 2 is can be seen that this in turn prevents the transmission of scan codes from the scan code transmission routine to the PC's central processing unit, thus disabling operation of the keyboard. The next time that Key Lock Detection State Machine 41 transitions through its 'Key Lock Det' state Keyboard Disable state machine 42 transitions to the 'Normal' state. Thus, it can be seen that each application by the user of the 'Ctrl'/'Alt'/'Backspace' simultaneous combination of keys will toggle the operating mode of the keyboard between normal and disabled.

It should be noted that the operation of Key Lock Detection State Machine 41 requires that only those keys included in the unique keyboard enabling/disabling combination to be depressed in order to effect a toggling of the keyboard enable mode. Thus, if, for example, a large number of keyboard keys were simultaneously depressed, as might occur when a large book is laid on the keyboard, the keyboard enable/disable mode will not change, even if by chance all of the unique keyboard enabling/disabling combination keys are included.

Alternate Preferred Embodiment

The keyboard lock method described in the previous paragraphs achieves the desired goals of being inexpensive, simple to use, and is compatible with existing keyboard manufacturing forms (the latter since only the embedded keyboard microprocessor software is changed). Now an alternative preferred embodiment is presented that achieves yet another goal of being totally compatible with existing keyboards. In this embodiment the keyboard locking mechanism is inserted between an existing keyboard and the PC. Here, as will be explained in the paragraphs that follow, the inventive device monitors the keyboard-to-PC transmissions and when a specific combination of multiple simultaneous keys are observed depressed the device then inhibits further user key-sourced transmissions from the keyboard to the PC's central processing unit, but allows PC-to-keyboard commands to pass along with their keyboard microprocessor responses. When the same specific combination of multiple simultaneous keys are again observed depressed the device then re-enables the keyboard for full operation. Further, the preferred embodiment is contained in an extension cable for the keyboard and makes use of the DC voltage that the PC provides for the keyboard via the cable for its own powering and therefore needs no external power supply or batteries.

Figure 4A:
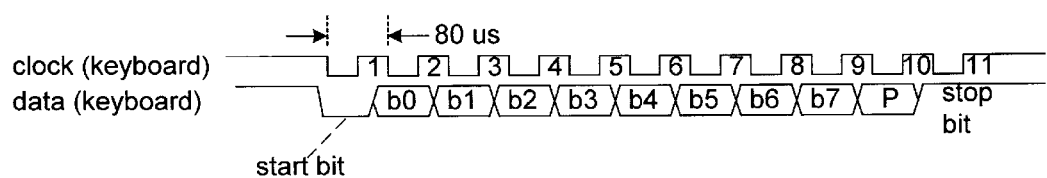
FIGS. 4a and 4b are timing diagrams illustrating the keyboard-to-PC and PC-to-keyboard transmissions.
Figure 4B:
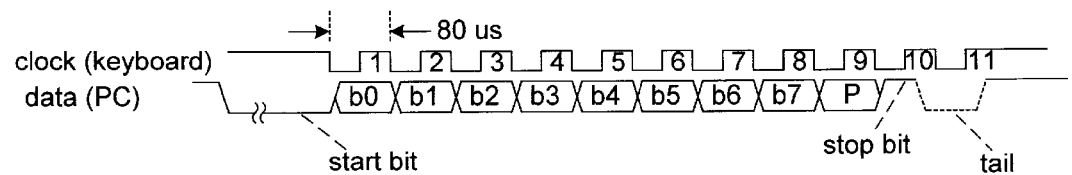

Keyboard/PC serial operation basics, FIGS. 4a and 4b

Before explaining the details of the alternate preferred embodiment, the general characteristics of the keyboard/PC communications for IBM compatible PCs will be explained. The reader should note that one of the roles of the scan code transmission routine of the previous FIGS. 1 and 2 is to implement the signal communications as described in the following paragraphs.

Communications sourced by the keyboard towards the PC consist primarily of individual eight-bit byte values comprising the scan codes associated with the various keys of the keyboard. When a keyboard key is depressed the processor contained within the keyboard detects this and generates a typically one to six byte 'make' scan code which it then transmits to the PC, one byte at a time. Similarly, when the key is then lifted, another, different 'break' scan code value is transmitted to the PC, again, one byte at a time. Each byte of these codes is transmitted separately from the others, thus the transmission illustrated in FIG. 2a is representative of any of the possible bytes comprising a keyboard scan code. The communication between the keyboard and PC is serial and is comprised of two signal wires: a clock signal, and a data signal. Both signals are bi-directional, meaning that either the PC or the keyboard can drive them, and are open-collector or open-drain in nature, meaning that when active they are driven by either the PC or keyboard to a low level, and when inactive are not driven and passive pull-up resistors pull them to a high level. In this way both sources can drive the signal without contending with each other where one might be attempting to drive the signal high while the other is attempting to drive it low with an undetermined result.

The clock signal is high, containing no transitions, when the data line is idle and there is no information to communicate between the keyboard and the PC. When the processor contained within the keyboard is ready to send a byte to the PC, it first checks to ensure that the PC is not driving the data line low. If this were the case, the keyboard processor desists from beginning its byte transmission since a low-driven data line from the PC indicates that the PC is trying to send a byte to the keyboard and the keyboard processor must wait until that transaction is complete. If, on the other hand, the keyboard processor detects that the data line is high, and not being driven by the PC, (and the PC is not driving the clock line low) then it begins the transmission of its byte by toggling the clock signal at nominally 12.5 KHz while placing the data on the data line during the high portion of each clock transition so that the data is stable when the clock signal transitions from low to high. FIG. 4a shows the structure of keyboard-sourced byte being sent to the PC (time proceeds from left to right). Each byte transmitted from the keyboard to the PC contains eleven clock transitions. The data value associated with the first clock transition is always low and is interpreted as the start bit, indicating the beginning of a byte transmission. The second to ninth clock transitions comprise the eight bits of the transmitted byte, least-significant bit first. The tenth clock transition comprises an odd-value parity bit, while the eleventh, and last, clock transition is always associated with a high data signal value and is interpreted as the stop bit.

FIG. 4b shows the structure of the clock and data signals comprising the PC-to-keyboard direction of the interface. Communications sourced by the PC towards the keyboard consist of operation commands. Some examples of these are: Reset, Read Keyboard ID, Resend, Select Alternate Scan Codes, etc. These commands are all one byte in length and some, e.g., the Reset command, require responses from the keyboard. Like the keyboard-sourced direction, the clock signal is high, containing no transitions, when the data line is idle and there is no information to communicate from the PC. When the PC is ready to send a byte to the keyboard it first drives the data line low for a period of time. As explained above, this alerts the keyboard that the PC is ready to send a byte. The keyboard then begins toggling the clock signal at a 12.5 KHz rate. As can be seen, the clock associated with both directions of data transfer is always generated by the keyboard. The PC then places its data bits on the data line with each falling edge of the keyboard-driven clock signal so that the data is stable during the rising edge of the clock. The structure of the PC-sourced data is similar to that of the keyboard-sourced data, except that whereas the first clock of the keyboard-to-PC data is associated with the keyboard's start bit, the first clock of the PC-to-keyboard data is associated with the first bit of the PC-sourced data byte (the PC start bit occurs before the keyboard begins toggling the clock). So, the first clock transition is associated with the least-significant PC data byte, while the eighth clock transition is associated with the most-significant and last bit of the PC data byte. The ninth clock transition comprises an odd-value parity bit, while the tenth clock transition is always associated with a high data signal value driven by the PC and is interpreted as the stop bit. Finally, after the keyboard observes the PC-driven stop bit the keyboard then drives the data line low for the last and final clock transition. This last keyboard-driven value is called the "tail" bit.

The PC drives the clock signal low when it wishes to inhibit the keyboard from transmitting any data. This is not shown in the diagrams. It is possible for the PC to first drive the clock line low, thus inhibiting keyboard transmissions and effectively reserving the interface, then driving the data line low, and finally lifting the clock line which then initiates a PC-to-keyboard transmission.

Figure 5:
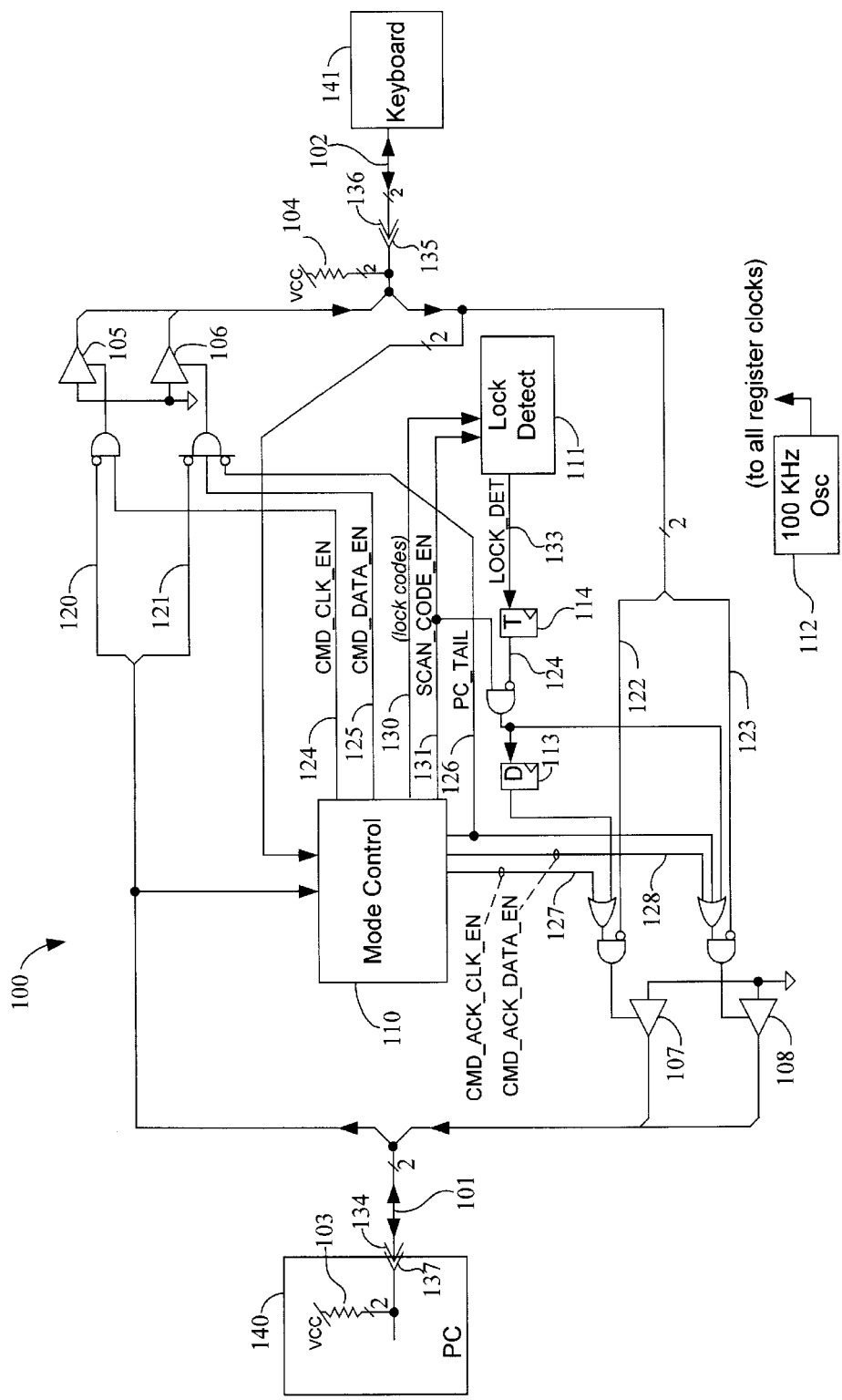
FIG. 5 shows the overall operation of the second embodiment of the keyboard disable/enable function.

Functional Operation of the Alternate Preferred Embodiment, FIG. 5

As was explained previously, the alternate preferred embodiment is inserted between the keyboard and the PC so that whereas originally there was a single cable, usually permanently attached to the keyboard, between the keyboard and PC, after the inventive device is inserted the original keyboard cable now connects the keyboard to the inventive device, and a second cable connects the inventive device to the PC. In the alternate preferred embodiment the inventive device is integrated into the second cable so that the user perceives effectively that an extension cable has been attached to the original keyboard cable.

The following are some of the functions performed by the alternate preferred embodiment:

1) since the inventive device is placed in the path of bi-directional, open-collector lines, it must, when not inhibiting transmissions, observe which side, if any, is driving a line and then it must drive the equivalent line on the opposite side in a like manner so that the sourced communication passes through—i.e., the inventive device must be transparent in both directions, 2) in all modes PC-sourced transmissions, i.e., operation commands, are passed to the keyboard, 3) the inventive device observes the transmissions sourced from the keyboard and when a simultaneous combination of depressed pre-determined keys, 'Ctrl', 'Alt', and 'Backspace' in the case of the preferred embodiments, is seen the inventive device toggles its mode of operation between normal, transparent operation and keyboard inhibit, 4) when in the keyboard inhibit mode the inventive device inhibits keyboard-sourced transmissions to the PC, 5) the inventive device draws power from the voltage provided by the PC on dedicated cable wires, and through-connects this voltage to equivalent wires on the keyboard-side cable for use by the keyboard.

FIG. 5 shows the functional operation of the alternate preferred embodiment of the invention. Keyboard lock device 100, PC-side cable 101 along with its cable connector 134, and keyboard-side cable connector 135 together comprise the extension cable and key lock mechanism placed between the PC and the keyboard. PC-side cable connector 134 mates to the built-in keyboard connector 137 of PC computer 140. Extension cable connector 135 mates to cable connector 136 which is part of cable 102 which is typically permanently attached as an integral part of keyboard 141. The reader will note that prior to the introduction of the inventive device, keyboard cable 102 would be attached directly to the built-in keyboard connector 137 of the PC computer.

Since, as was explained previously, the clock and data signals carried by the PC/keyboard cable are driven in an open-collector or open-drain mode, they require pull-up resistors in order to provide for inactive high levels. Typically the PC computer contains these pull-up resistors 103 as shown. Since the signals are bi-directional and being that the inventive device is placed in the signal paths, it is necessary for the inventive device to drive signals sourced from one side onto the other side. This is done via tri-state drivers 105 and 106 in the PC-to-keyboard direction, and via tri-state drivers 107 and 108 in the keyboard-to-PC direction. Mode Control function 110, described in detail later, monitors the two PC-to-keyboard signals 120 and 121 and the two keyboard-to-PC signals 122 and 123. When Mode Control function 110 determines that the PC is driving signals 120 and 121 towards the keyboard, it enables low levels of these PC-sourced interface signals via control signals 124, 125, and 126 to enable tri-state drivers 105 and 106 to drive low levels onto the associated signals of the keyboard-side cable. The operation of these three signals is described in detail later. Conversely, when Mode Control function 110 determines that the keyboard is driving signals 122 and 123 towards the keyboard, and further, that the keyboard-sourced signals should be allowed to be passed on to the keyboard as controlled by Lock Detect function 111 and control signal 124, the Mode Control function enables low levels of these keyboard-sourced interface signals via control signals 126, 127, and 128 to enable tri-state drivers 107 and 108 to drive low levels onto the associated signals of the PC-side cable. In this way, the inventive device passes PC communications to the keyboard with boosted electrical buffering, and passes selective keyboard communications to the PC, also with boosted electrical buffering. Since the inventive device electrically isolates the keyboard interface from that of the PC, pull-up resistors 104 are used to accommodate inactive high levels on the keyboard interface in a similar fashion as resistors 103 included in the PC.

100 KHz oscillator 112 provides all clocking for keyboard lock device 100. As will be seen, the basic period of the clock, and associated data signals, of the PC/keyboard interface is 12.5 uS, and thus the 100 KHz oscillator provides a times-8 clock for sampling and enabling the PC/keyboard transmissions. Since this 100 KHz clock is used universally throughout the inventive device, for clarity its various connections are not shown and should be assumed in any instance where a clocking action is shown by the standard clock input symbol, e.g., such as is shown on D-type flip-flop 113.

The existing PC/keyboard interface cable includes voltage (usually +5 Volts) and ground for powering the keyboard, not shown in FIG. 5. The inventive device uses this voltage for its powering needs and also passes the same voltage and ground connections on to the keyboard.

Figure 6:
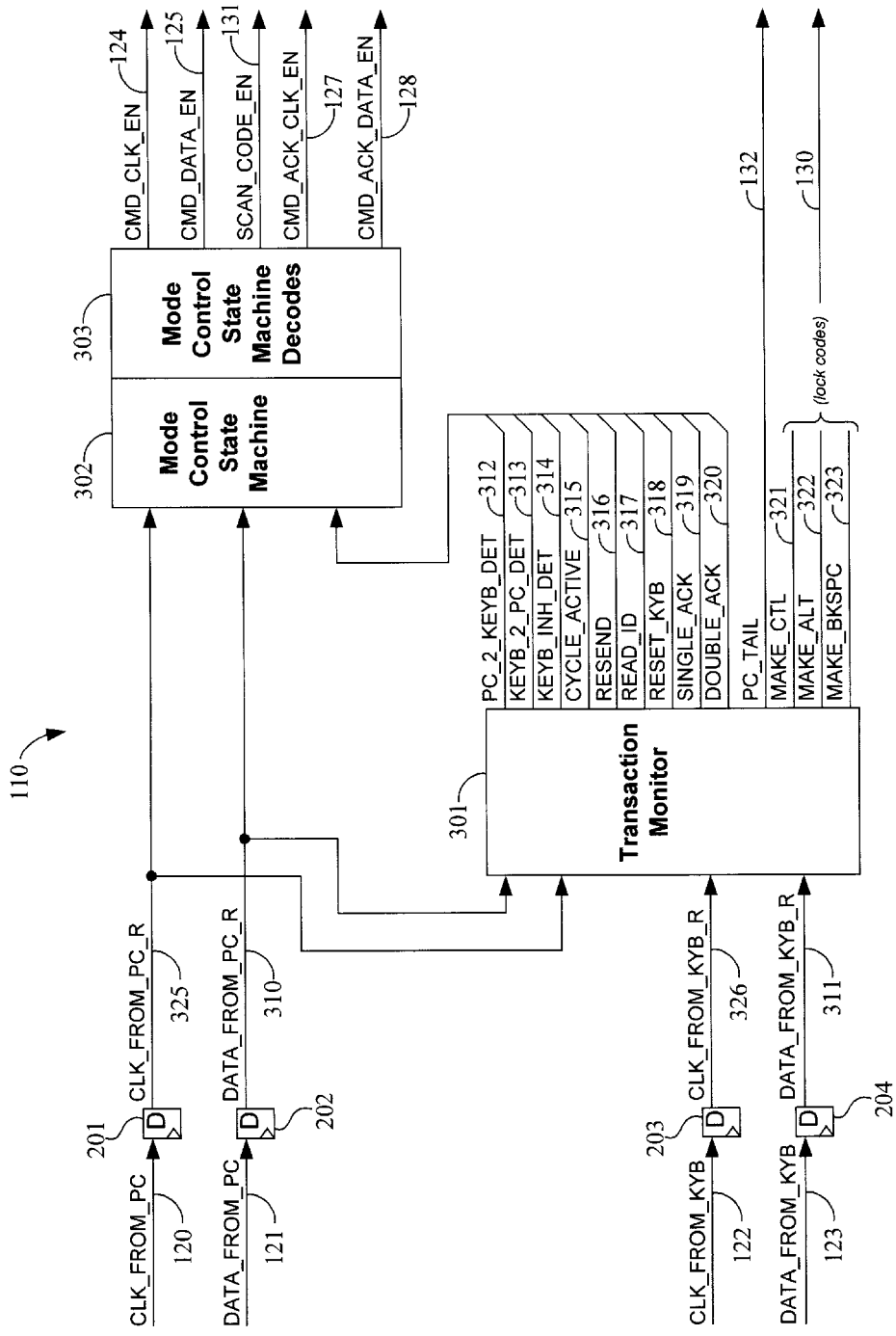
FIG. 6 is a block diagram of the Mode Control function of the second embodiment of the keyboard disable/enable function.

Mode Control, FIG. 6

FIG. 6 shows the block-level operation of the Mode Control function 110 shown previously in FIG. 5. Mode Control 110 functions include Transaction Monitor 301 which identifies sequence components of transmissions in both directions and captures and decodes the associated byte value, and Mode Control State Machine 302 which provides overall control of the various tri-state drivers shown previously in FIG. 5 which in turn, as was seen, determine which signals are allowed to pass between the PC and keyboard.

The data and clock lines from both the PC and keyboard are registered with the local CLK_100K clock in registers 201, 202, 203, and 204 to become CLK_FROM_PC_R, 325, CLK_FROM_KYB_R, 326, DATA_FROM_PC_R, 310, and DATA_FROM_KYB_R, 311 respectively. This is necessary since their transitions are asynchronous to the local CLK_100K clock and could cause spurious operations of the various state machines, all of which are clocked by the local CLK_100K clock.

Figure 7:
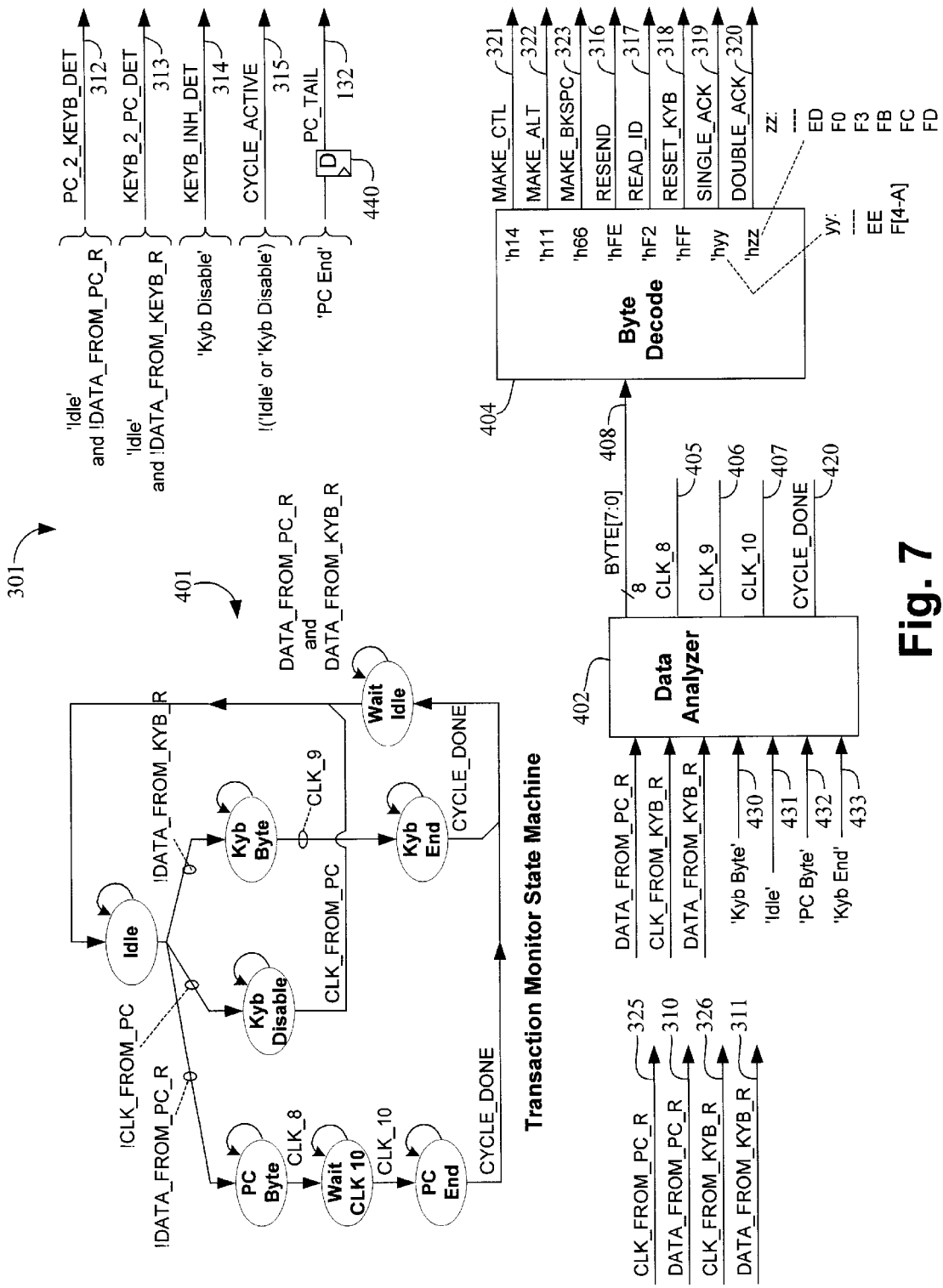
FIG. 7 shows a state flow diagram of the Mode Control State Machine.

Transaction Monitor, FIG. 7

Transaction Monitor function 301, detects and tracks the progression of transmission cycles and captures and decodes transmitted bytes. FIG. 7 shows the operation of Transaction Monitor block 301. Transaction Monitor state machine 401 tracks the general functional flow of the block, while the Data Analyzer block 402 tracks the progression of each byte transmission and captures the transmitted byte. Data Analyzer block 402 takes as inputs certain states of Transaction Monitor state machine 401, specifically states 'Kyb Byte' 430, 'Idle' 431, 'PC Byte' 432, and 'Kyb End' 433. Data Analyzer block 402 presents the captured transmitted byte as BYTE[7:0] signal 408. This captured byte is then decoded by Byte Decode block 404. The meaning of most the decode outputs of Byte Decode block 404 is explained later when Mode Control State Machine 302 is described, however three of them, namely MAKE_CTL 321, MAKE_ALT 322, and MAKE_BKSPC 323, collectively labeled as 'lock codes' 130 in FIGS. 5 and 6, represent the three keys associated with toggling the enabled mode of the keyboard and their use is explained later when describing Lock Detect function 111 shown in FIG. 5. Also as outputs from Data Analyzer block 402 are signals marking the progression of the byte transmission which are used by Transaction Monitor state machine 401. These are: CLK_8 signal 405 which indicates that the eighth clock of the byte transmission has occurred, CLK_9 signal 406 which indicates that the ninth clock of the byte transmission has occurred, CLK_10 signal 407 which indicates that the tenth clock of the byte transmission has occurred, and CYCLE_DONE signal 420 which indicates that the byte transmission has completed. The operation of Data Analyzer block 402 is explained later.

Next, Transaction Monitor state machine 401 operation will be described. The normal, inactive state, labeled 'Idle', represents periods when the keyboard is not transmitting scan code characters, and when the PC is not transmitting keyboard commands, nor is the keyboard replying to those commands. When the DATA_FROM_PC_R signal 310 goes low, indicating that the PC is attempting to transmit a command, Transaction Monitor state machine 401 transitions to the 'PC Byte' state. This state is associated with the transmission of the eight bits of the byte within the eleven-bit transmission cycle. Transaction Monitor state machine 401 remains at this state until the eighth clock occurrence, as indicated by the CLK_8 signal, when Transaction Monitor state machine 401 then transitions to the 'Wait CLK 10' state where it remains until the tenth clock, as indicated by the CLK_10 signal, when it then transitions to the 'PC End' state where it remains until the CYCLE_DONE signal goes active indicating that the eleventh and last clock has occurred. From here Transaction Monitor state machine 401 transitions to the 'Wait Idle' state where it remains until the transmission cycle is ended as indicated by DATA_FROM_PC_R signal 310 going high.

When Transaction Monitor state machine 401 is in the 'Idle' state and CLK_FROM_PC_R signal 325 goes low, indicating that the PC is driving the clock line low, the state machine transitions to the 'Kyb Disable' state. This state is associated with periods when the PC is inhibiting keyboard transmissions. Transaction Monitor state machine 401 remains here until CLK_FROM_PC_R signal 325 goes high, indicating the end of the PC inhibit period, when the state machine returns to the 'Idle' state.

When Transaction Monitor state machine 401 is in the 'Idle' state and DATA_FROM_KYB_R signal 311 goes low, indicating that the keyboard is attempting to transmit a byte, Transaction Monitor state machine 401 transitions to the 'Kyb Byte' state. This state is associated with the transmission of the eight bits of the byte within the eleven-bit transmission cycle. Transaction Monitor state machine 401 remains at this state until the ninth clock occurrence (the reader will note that the first clock of a keyboard transmission is the start bit, and the second clock is the first bit of the eight-bit byte), as indicated by the CLK_9 signal 406, when the state machine transitions to the 'Kyb End' state where it remains until the CYCLE_DONE signal 420 goes active indicating that the eleventh and last clock has occurred. From here Transaction Monitor state machine 401 transitions to the 'Wait Idle' state where it remains until the transmission cycle is ended as indicated by DATA_FROM_KYB_R signal 311 going high. Control outputs from this module are generated based on the state of Transaction Monitor state machine 401. Following are descriptions of each of these signals:

PC_2_KEYB_DET 312—this signal indicates that a PC-generated transmission is being attempted. The 'Idle' state of Transaction Monitor state machine 401 represents a condition whereby previous transmissions have been completed and a new one has not yet begun. PC_2_KEYB_DET signal 312 is generated by ANDing the 'Idle' state with a low level of DATA_FROM_PC_R 310 which indicates that the PC is signaling to the keyboard that it wishes to transmit a byte. In this way the PC_2_KEYB_DET signal 312 will go active for one CLK_100 clock period since the state machine will then transition out of the 'Idle' state to the 'PC Byte' state.

KEYB_2_PC_DET 313—this signal indicates that a keyboard-generated transmission is being attempted. Again, since the 'Idle' state of Transaction Monitor state machine 401 represents a condition whereby previous transmissions have been completed and a new one has not yet begun, KEYB_2_PC_DET 313 is generated by ANDing the 'Idle' state with a low level of DATA_FROM_KYB_R 311 which indicates the keyboard is signaling to the PC that it is going to transmit a byte. In this way KEYB_2_PC_DET 313 signal will go active for one CLK_100 clock period since the state machine will then transition out of the 'Idle' state to the 'Kyb Byte' state.

KEYB_INH_DET 314—this signal indicates that the PC is inhibiting the keyboard from transmitting and is made active whenever Transaction Monitor state machine 401 is in the 'Kyb Disable' state, since this state represents that condition.

CYCLE_ACTIVE 315—this signal indicates that a transmission cycle is in progress and is simply made active whenever Transaction Monitor state machine 401 is not in the 'Idle' or 'Kyb Disable' states.

PC_TAIL 132—this signal is used to enable keyboard data to the PC during the Tail period shown earlier in FIG. 4*b*. It is made active when Transaction Monitor state machine 401 is in the 'PCEnd' state since this state represents the eleventh and last bit of a PC-to-keyboard transmission cycle. PC_TAIL signal 132 is registered by register 440 from the decode of the 'PC End' state in order to avoid spurious enabling of the keyboard data line during other Transaction Monitor state machine 401 transitions.

Figure 8:
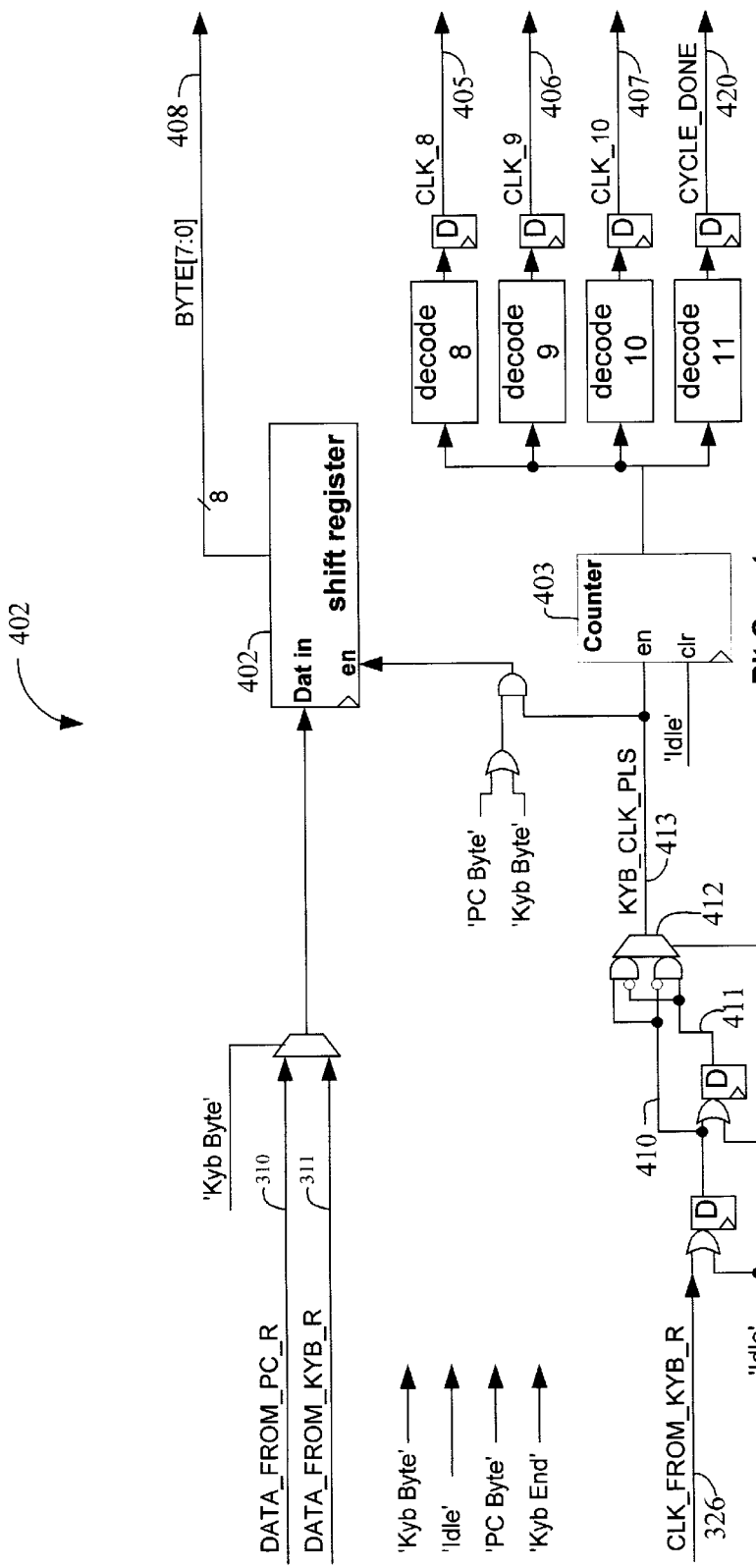
FIG. 8 shows the decode outputs of the Mode Control State Machine.

Data Analyzer, FIG. 8

FIG. 8 shows the operation of Data Analyzer block 402 of the Transaction Monitor operation just described. The main components of this function are shift register 402 which stores transmitted bytes, and Bit Counter 403 which tracks the individual bit occurrences of the transaction cycle.

As has been seen, operation of Transaction Monitor state machine 401 requires counting the clocked bit occurrences of a transmission cycle. The first step is to delineate the individual clock occurrences on the clock line from the keyboard. KYB_CLK_PLS signal 413 goes active for one CLK_100K local clock period each occurrence of a keyboard-sourced clock cycle. For keyboard-to-PC transmissions this occurs after the clock line transitions from high to low since Transaction Monitor state machine 401 is in either the 'Kyb Byte' or 'Kyb End' states and, therefore, multiplexer 412 is selecting the ANDed combination of a low signal 410, and a high signal 411 which occurs for only one CLK_100K period after the clock line transitions from a high to a low. For PC-to-keyboard transmissions this occurs after the clock line transitions from low to high since multiplexer 412 is now selecting the ANDed combination of a high signal 410, and a low signal 411 which occurs for only one CLK_100K period after the clock line transitions from a low to a high. Selection of these different edges of clock line transition is done in order to optimize the sampling of data in shift register 402. As can be seen in the previous FIG. 4*a* and 4*b*, these times coincide with when the transmitted bits are stable on the data line. The delay registers storing signal 410, and signal 411 are preset to one when Transaction Monitor state machine 401 is in the 'Idle' state in order to avoid missing the first KYB_CLK_PLS signal 413 generation as Transaction Monitor state machine 401 is in transition from the 'Idle' state to the 'Kyb Byte' state as a result of a keyboard scan character transmission. If these registers were not preset by the 'Idle' state KYB_CLK_PLS signal 413 might not pulse active since multiplexer 412 might switch to the keyboard polarity mode too late, or even if KYB_CLK_PLS signal 413 does pulse active, Bit Counter 403 might not increment from zero to one since it is held cleared by the 'Idle' state. By presetting these registers during the 'Idle' state the activation of the pulsed KYB_CLK_PLS signal 413 is delayed until Transaction Monitor state machine 401 has securely transitioned to the 'Kyb Byte' state and Bit Counter 403 is no longer held cleared.

Each active occurrence of KYB_CLK_PLS signal 413 just described enables Bit Counter 403 to increment one count. Since the Bit Counter is cleared when Transaction Monitor state machine 401 is in the 'Idle' state, i.e., between each transmission cycle, it can be seen that the value of Bit Counter 403 will coincide with the bit position of the corresponding keyboard-generated clock in the current transmission cycle. The reader will note that the clear of counter 403 is independent of the enable. The output of Bit Counter 403 is then decoded and selected values are latched to generate the various bit count indications 405, 406 and 407, which are used by Transaction Monitor state machine 401 as previously described. CYCLE_DONE signal 420 is simply the latched decode of the eleventh and last bit count of a transmission cycle.

Shift Register 402 is also enabled by signal KYB_CLK_PLS 413, however the shift operation is also gated with the 'PC Byte' and 'Kyb Byte' states of Transaction Monitor state machine 401 which correspond to those bits of transmission cycles for PC-to-keyboard and keyboard-to-PC transmissions, respectively, corresponding to the transmitted data byte. In this way when Transaction Monitor state machine 401 transitions out of the 'PC Byte' or 'Kyb Byte' states the transmitted byte of the transmission cycle remains in Shift Register 402. The parallel output of Shift Register 402, signal BYTE[7:0] 408, is then made available to Byte Decode block 404 and used for decoding selected transmitted byte values as previously described. It should be noted that these decoded indications will remain valid until the next transmission cycle replaces them. It should be also noted that the decode examples used in this preferred embodiment represent the 'scan code set 2' which is used by PC/AT keyboards. Of course, other scan code sets, such as, for example, 'scan code set 1' for PC/XT keyboards, could be used as well.

Figure 9:
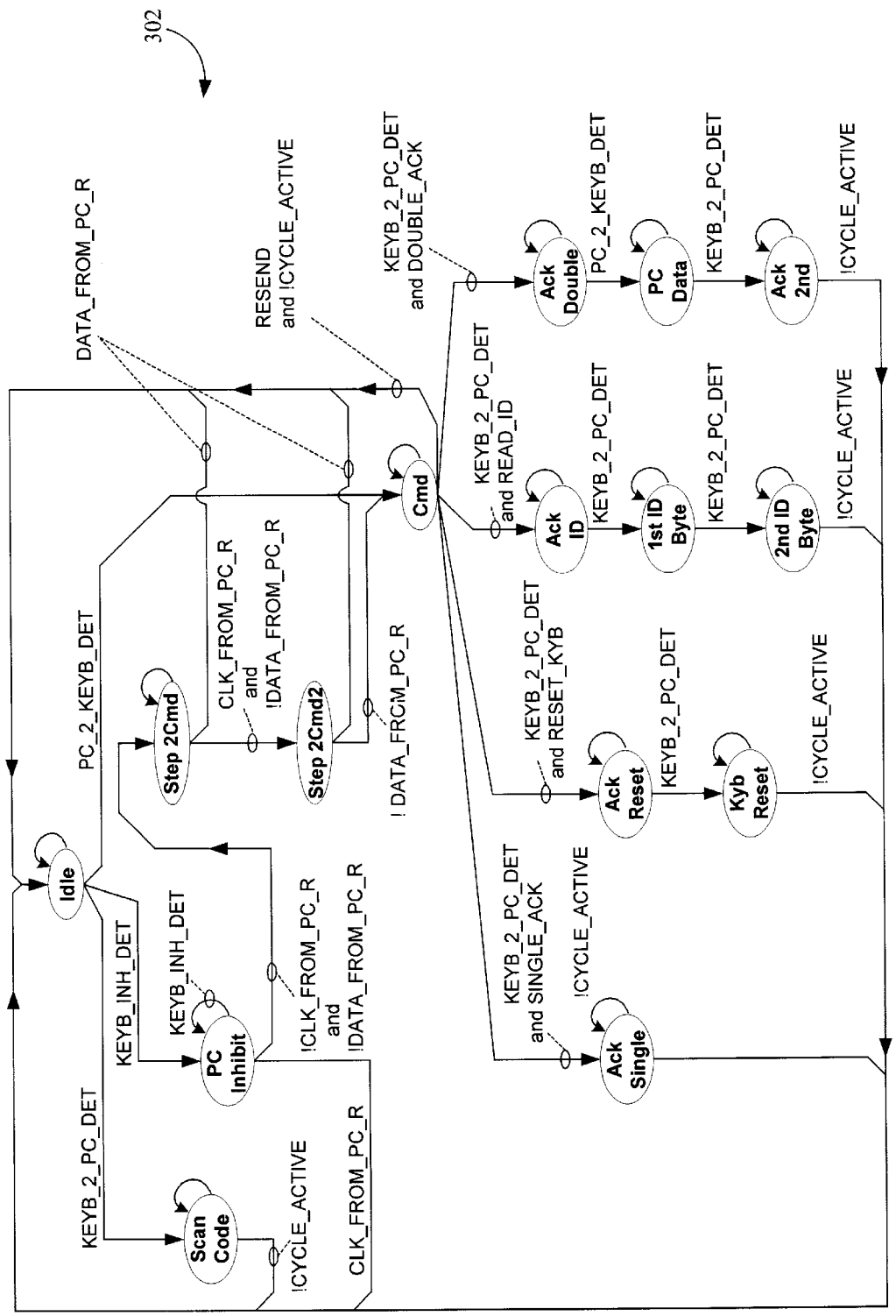
FIG. 9 shows a block diagram and state flow diagram of the Transaction Monitor function of the second embodiment of the keyboard disable/enable function.

Mode Control State Machine, FIG. 9

Mode Control State Machine 302 manages overall operating states of the inventive device that generally do not change, for example, during transmission cycles shown previously in FIGS. 4a and 4b. Mode Control State Machine 302 is divided into fifteen individual states as shown by in FIG. 9. The normal, inactive state, labeled 'Idle', represents periods when the keyboard is not transmitting scan code characters and when the PC is not transmitting keyboard commands, nor is the keyboard replying to those commands. When Mode Control State Machine 302 is in the 'Idle' state and Transaction Monitor 301 shown on FIG. 6 indicates that a keyboard transmission has begun via KEYB_2_PC_DET signal 313, the state machine transitions to the 'Scan Code' state. The 'Scan Code' state is associated with scan code transmissions from the keyboard to the PC. Mode Control State Machine 302 remains in this state only for one scan code character transmission. Mode Control State Machine 302 leaves the 'Scan Code' state and returns to the 'Idle' state when Transaction Monitor block 301 indicates that the transmission cycle is complete via CYCLE_ACTIVE signal 315.

When Mode Control State Machine 302 is in the 'Idle' state and Transaction Monitor block 301 indicates that a PC transmission has begun via PC_2_KEYB_DET signal 312, the state machine transitions to the 'Cmd' state. Whereas keyboard scan code transmissions comprise independent scan codes characters, each isolated from the rest with no associated response from the PC, PC transmissions comprise commands to the keyboard, and the commands vary in their interactive interplay with the keyboard. One command, the Resend command, requires no acknowledgement from the keyboard, but all others do. Some commands, collectively here called Single Acknowledge commands, require a single acknowledge character to be transmitted by the keyboard. Since the alternate preferred embodiment of the inventive device does not need to distinguish between these Single Acknowledge commands, Transaction Monitor block 301, simply decodes a single signal, SINGLE_ACK 319, which serves to indicate that one of the single acknowledge commands has been passed on to the keyboard. When Mode Control State Machine 302 is in the 'Cmd' state and Transaction Monitor block 301 indicates that a keyboard transmission has begun via KEYB_2_PC_DET signal 313, and further, indicates that the previous PC command was of the Single Acknowledge type, just described, via the SINGLE_ACK signal 319, the state machine transitions to the 'Ack Single' state. It remains here until the current acknowledge character transmission by the keyboard is completed as indicated via the CYCLE_ACTIVE signal 315 going inactive, when Mode Control State Machine 302 then transitions back to the 'Idle' state.

The Reset command from the PC requires two subsequent character cycle transmissions from the keyboard, the first being the standard acknowledgement character, while the second is the keyboard's result of its Basic Assurance Test. Therefore, when Mode Control State Machine 302 is in the 'Cmd' state and Transaction Monitor block 301 indicates that a keyboard transmission has begun via the KEYB_2_PC_DET signal 313, and further, indicates that the previous PC command was the Reset command via signal RESET_KYB 318, the state machine transitions to the 'Ack Reset' state. It remains here until the current acknowledge character transmission is completed and the next cycle transmission (the Basic Assurance Test result) begins as indicated via the KEYB_2_PC_DET signal 313 going active, when the state machine then transitions to the 'Kyb Reset' state. Mode Control State Machine 302 then remains in this state until the current keyboard-sourced character transmission is completed as indicated via the CYCLE_ACTIVE signal 315 going inactive, when the state machine then transitions back to the 'Idle' state.

The Read ID command from the PC requires three subsequent character cycle transmissions from the keyboard, the first being the standard acknowledgement character, while the second and third are the keyboard's ID information. Therefore, when Mode Control State Machine 302 is in the 'Cmd' state and Transaction Monitor 301 indicates that a keyboard transmission has begun via the KEYB_2_PC_DET signal 313, and further, indicates that the previous PC command was the Read ID command via signal READ_ID 317, the state machine transitions to the 'Ack ID' state. It remains here until the current acknowledge character transmission is completed and the next cycle transmission (the first ID byte) begins as indicated via the KEYB_2_PC_DET signal 313 going active, when Mode Control State Machine 302 then transitions to the '$1^{st}$ ID Byte' state. It remains here until the first ID byte character transmission is completed and the next cycle transmission (the second ID byte) begins as indicated via the KEYB_2_PC_DET signal 313 going active, when Mode Control State Machine 302 then transitions to the '2nd ID Byte' state. Mode Control State Machine 302 then remains in this state until the current keyboard-sourced character transmission is completed as indicated via the CYCLE_ACTIVE signal 315 going inactive, when the state machine then transitions back to the 'Idle' state.

Some commands, collectively called Double Acknowledge commands, require two acknowledge characters to be transmitted by the keyboard, with a PC-sourced byte sent from the PC to the keyboard between. Since the alternative preferred embodiment of the inventive device does not need to distinguish between these Double Acknowledge commands, Transaction Monitor 301, simply decodes a single signal, DOUBLE_ACK 320, which serves to indicate that one of the double acknowledge commands has been passed on to the keyboard. When Mode Control State Machine 302 is in the 'Cmd' state and Transaction Monitor 301 indicates that a keyboard transmission has begun via KEYB_2_PC_DET signal 313, and further, indicates that the previous PC command was of the Double Acknowledge type, just described, via the DOUBLE_ACK signal 320, Mode Control State Machine 302 transitions to the 'Ack Double' state. It remains here until the current acknowledge character transmission is completed and the next cycle transmission (the PC-sourced byte) begins as indicated via the PC_2_KEYB_DET signal 312 going active, when Mode Control State Machine 302 then transitions to the 'PC Data' state. Mode Control State Machine 302 remains here until the PC byte transmission is completed and the next cycle transmission (the second keyboard acknowledge) begins as indicated via the KEYB_2_PC_DET signal 313 going active, when the state machine then transitions to the 'Ack $2^{nd}$' state. Mode Control State Machine 302 then remains in this state until the current keyboard-sourced character transmission is completed as indicated via the CYCLE_ACTIVE signal 315 going inactive, when the state machine then transitions back to the 'Idle' state.

The final type of PC command is that of the Resend mentioned earlier. The Resend command requires no acknowledgment from the keyboard, so once the PC-sourced command byte transmission is complete as indicated by the CYCLE_ACTIVE signal 315 going inactive, and Transaction Monitor 301 indicates that the previous PC command was the Resend command via signal RESEND 316, Mode Control State Machine 302 transitions back to the 'Idle' state.

As mentioned earlier, when the PC wishes to inhibit keyboard transmissions it lowers the clock line. When Mode Control State Machine 302 is in the 'Idle' state and Transaction Monitor 301 indicates that the PC is inhibiting keyboard transmissions via the KEYB_INH_DET signal 314, the state machine transitions to the 'PC Inhibit' state. It remains here until one of two conditions occurs: 1) if the PC stops driving the clock line, as indicated by CLK_FROM_PC_R signal 325 signal going high, Mode Control State Machine 302 transitions back to the 'Idle' state since this indicates that the PC is not longer inhibiting keyboard transmissions, or 2) the PC continues to drive the clock line low, but now also drives the data line low, as indicated by the registered PC data line, DATA_FROM_PC_R signal 310, going low. This second condition occurs when the PC is preparing to send a command byte and the state machine then transitions to the 'Step 2 Cmd' state. It remains here until the PC stops driving the clock line, as indicated by CLK_FROM_PC_R signal 325 going high. This indicates that the PC is now requesting to send a command and Mode Control State Machine 302 transitions to the 'Step 2 Cmd 2' state and then one clock later transitions to the 'Cmd' state. From here the operation is as described in previous paragraphs. If the PC should stop driving the data line, as indicated by the DATA_FROM_PC_R signal 310 going high, Mode Control State Machine 302 transitions from either the 'Step 2 Cmd' state or the 'Step 2 Cmd 2' state back to the 'Idle' state since this means that the PC is no longer preparing to send a command. The 'Step 2 Cmd 2' state serves to ensure that the PC has not abandoned its intention to send a command by ceasing to drive both the clock and data lines together.

Figure 10:
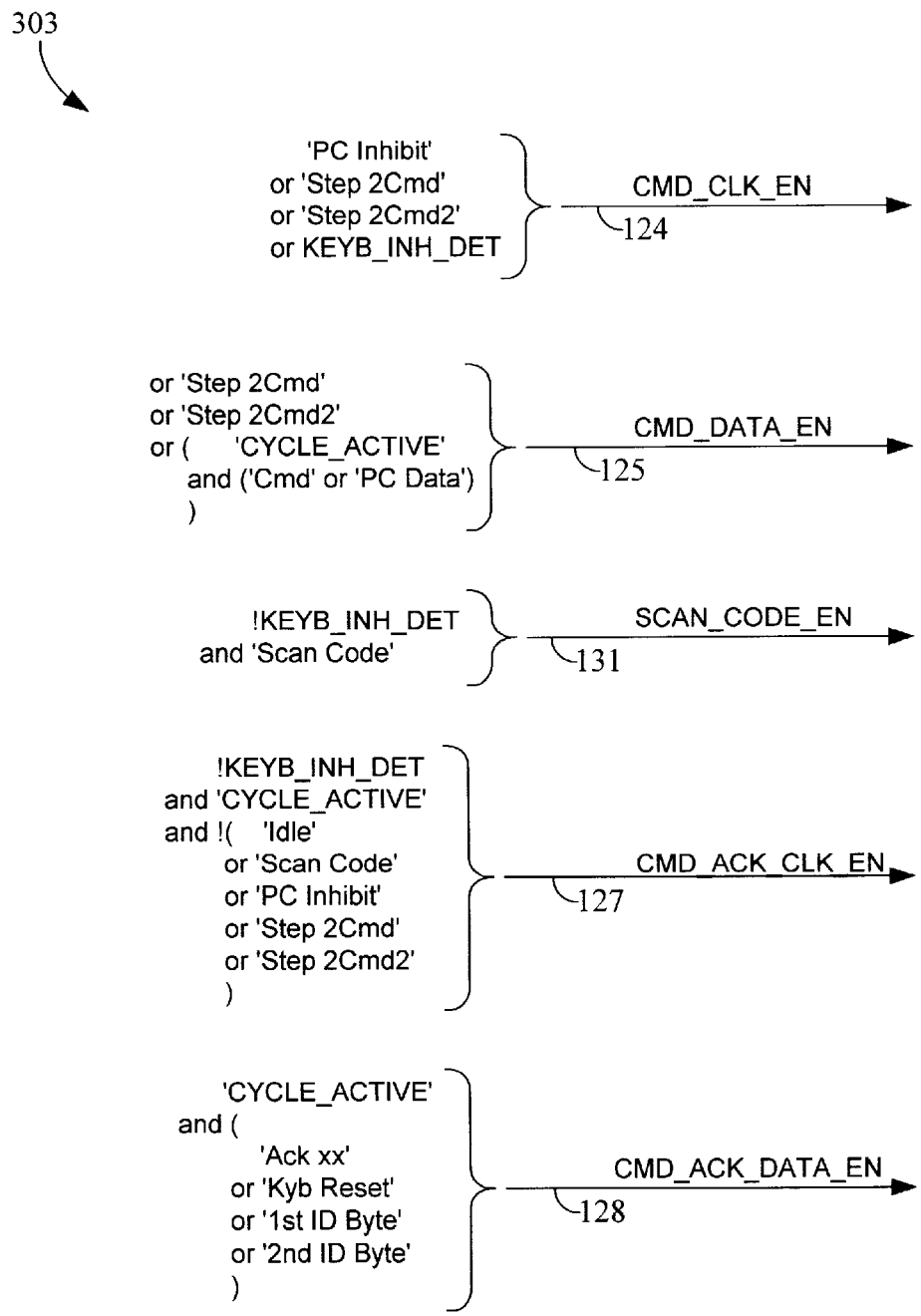
FIG. 10 shows the operation of the Data Analyzer block of the Transaction Monitor.

Mode Control State Machine Decodes, FIG. 10

As indicated earlier, output signals of Mode Control State Machine Decode block 303 control the tri-state enables of the data and clock lines in the two transmission directions—PC-to-keyboard, and keyboard-to-PC, as shown previously in FIG. 5. These signals are activated during certain Mode Control State Machine 302 states in combination with certain transaction indicators from Transaction Monitor 301. FIG. 10 shows these decode combinations which are now described:

CMD_CLK_EN 124—this signal enables the PC-sourced clock towards the keyboard. The PC only drives the clock line low when it is inhibiting the keyboard transmissions. This mode is associated with the Mode Control State Machine 302 states 'PC Inhibit', 'Step 2 Cmd', and 'Step 2 Cmd 2', and, therefore, the CMD_CLK_EN signal 124 is made active during these states. Additionally, the CMD_CLK_EN signal 124 is made active when the KEYB_INH_DET signal 314 generated by Transaction Monitor block 301, is active. This is necessary since the PC may temporarily inhibit keyboard transmissions prior to its transmission of command-related bytes that may occur subsequent to its first command byte, e.g., those commands that comprise the Double Acknowledge class described earlier.

CMD_DATA_EN 125—this signal enables the PC-sourced data towards the keyboard. This mode is associated with Mode Control State Machine 302 states 'Step 2 Cmd', 'Step 2 Cmd 2', 'Cmd', and 'PC Data', and, therefore, the CMD_DATA_EN signal 125 is made active during these states. Additionally, the CMD_DATA_EN signal 125 is gated with CYCLE_ACTIVE signal 315 for states 'Cmd', and 'PC Data' since otherwise the PC data would continue to be enabled towards the keyboard after the PC byte transmission is complete (the reader should note that the state machine stays at these states until a keyboard transmission begins).

SCAN_CODE_EN, 131—this signal enables the keyboard-sourced clock and data towards the PC when the keyboard is generating scan code characters (and the inventive Keyboard lock device is not currently in a lock state). This mode is associated with Mode Control State Machine 302 state 'Scan Code', and, therefore, the SCAN_CODE_EN signal 131 is made active during this state. SCAN_CODE_EN signal 131, however, is gated with a low KEYB_INH_DET signal 314 in the unlikely event that the DATA_FROM_KYB_R signal 311 from the keyboard and CLK_FROM_PC_R signal 325 from the PC both go low near simultaneously so that Mode Control State Machine 302 recognizes the KEYB_2_PC_DET signal 313 first and transitions to the 'Scan Code' state even though the PC is attempting to inhibit keyboard transmissions. It should be noted that register 113, shown previously in FIG. 5, serves to delay the enabling of the PC clock signal 122 by one local 100 KHz clock so that the falling edge of the PC clock signal is guaranteed to occur during the start bit at the beginning of a keyboard-to-PC transaction as shown previously in FIG. 4a, CMD_ACK_CLK_EN, 127—this signal enables the keyboard-sourced clock towards the PC both when the keyboard is transmitting response bytes as a result of PC commands, and when the PC is transmitting commands and command associated data to the keyboard (as was explained earlier, the keyboard generates clocks for transmissions in both directions). This mode is associated with a majority of Mode Control State Machine 302 states, so this signal is generated when the state machine is not in those states where it would not be active. These states are 'Idle', 'Scan Code', 'PC Inhibit', 'Step 2 Cmd', and 'Step 2 Cmd 2'. Additionally, the generation of the CMD_ACK_CLK_EN signal 127 is gated with both the CYCLE_ACTIVE signal 315, so that the clock line from the keyboard is enabled only during transactions, and the inverse of the KEYB_INH_DET signal 314 so that the clock line from the keyboard is inhibited if the PC is driving the clock line low, since this means that the PC is attempting to inhibit keyboard transmissions (as well as its own).

CMD_ACK_DATA_EN, 128—this signal enables the keyboard-sourced data towards the PC when the keyboard is transmitting response bytes as a result of PC commands. This mode is associated with Mode Control State Machine 302 states 'Ack Single', 'Ack Reset', 'Ack ID', 'Ack Double', 'Ack 2nd' (collectively shown as "'Ack xx'" in FIG. 10), 'Kyb Reset', '1$^{st}$ID Byte', and '2$^{nd}$ ID Byte', therefore, the CMD_ACK_DATA_EN signal 128 is made active during these states. Additionally, generation of the CMD_ACK_DATA_EN signal 128 is gated with the CYCLE_ACTIVE signal 315 so that the clock line from the keyboard is enabled only during transactions.

Figure 11:
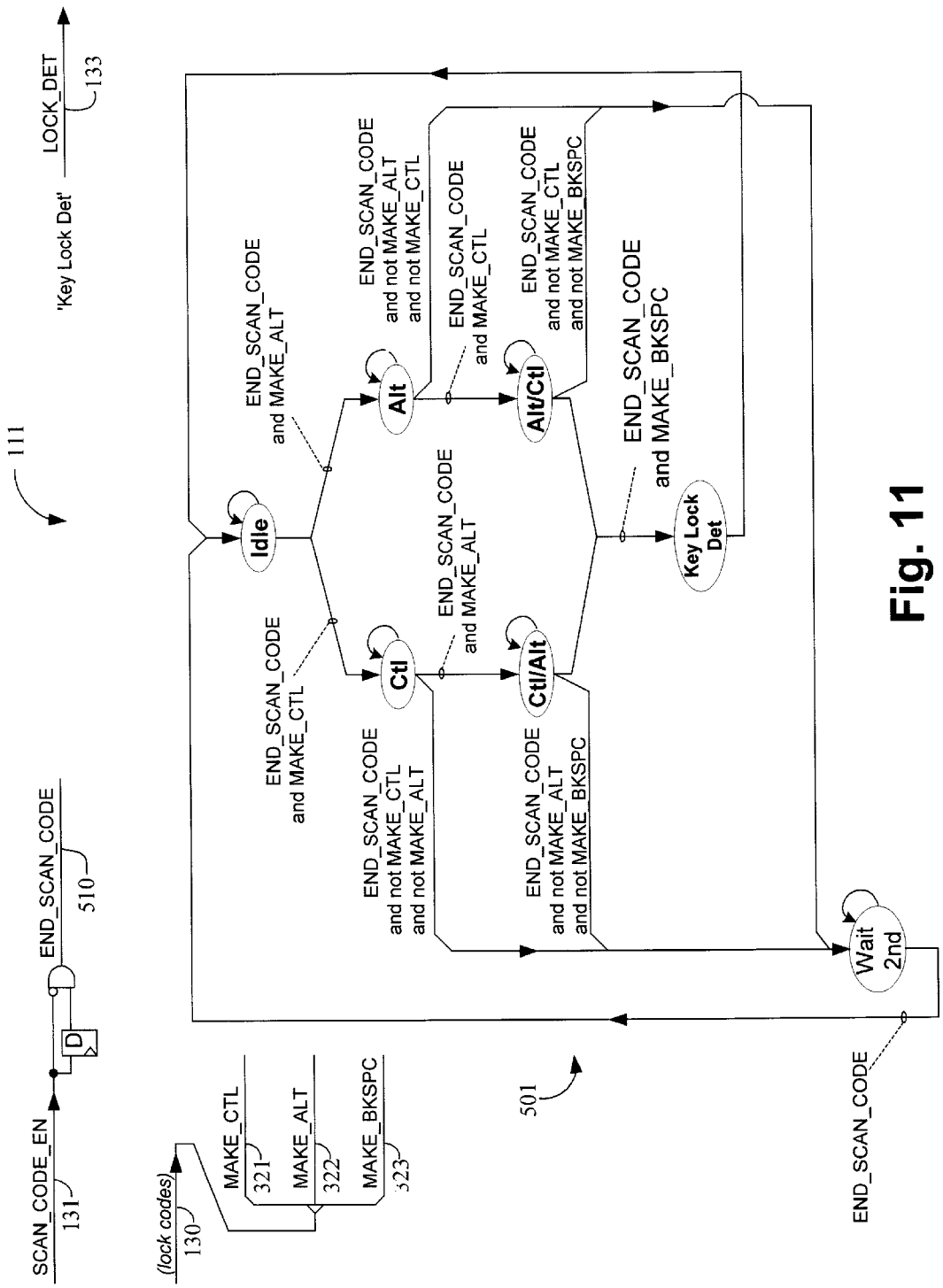
FIG. 11 shows a state flow diagram of the Lock Detect block of the second embodiment of the keyboard disable/enable function.

Lock Detect, FIG. 11

Referring for the moment back to FIG. 5, Lock Detect function 111 accepts as inputs 'lock codes' 130, which, as has been explained, comprise the decoded indications for each of the three keyboard keys which together toggle the enabling of the keyboard, and the signal SCAN_CODE_EN 131, which, as has been explained, indicates that the PC/keyboard communications mode is that of Keyboard scan code transmission towards the PC, and, therefore, is used as an enabling or gating signal for the 'lock codes'. The output of Lock Detect function 111 is signal LOCK_DET 133 which, when active for one 100 KHz clock period, causes the output 124 of toggle flop 114 to change polarity. When toggle flop output 124 is low SCAN_CODE_EN signal 131 will enable the transmission of keyboard clock and data signals 122 and 123 to pass to the PC, while when toggle flop output 124 is high SCAN_CODE_EN signal 131 will be disabled, inhibiting the transmission of keyboard clock and data signals 122 and 123 to pass to the PC. Thus, an activation of the LOCK_DET signal 133 will toggle the enabled/disabled state of the keyboard operation as is one of the primary features of the inventive device.

FIG. 11 shows the operation of Lock Detect function 111 and how the LOCK_DET signal 133 is activated for one clock period when the simultaneous depression of the particular keyboard enabling/disabling keys are made, in the case of the alternate preferred embodiment, the 'Ctrl', 'Alt', and 'Backspace' keys. Comparing FIG. 11 with the previous FIG. 3 it can be seen that Lock Detect State Machine 501 of FIG. 11 is very similar to the Key Lock Detection State Machine 41 of FIG. 3. Since the operation of Key Lock Detection State Machine 41 of FIG. 3 was explained earlier, and since that explanation is correspondingly valid for Lock Detect State Machine 501 shown in FIG. 11, only the differences are explained here.

Firstly, whereas Key Lock Detection State Machine 41 of FIG. 3 uses scan code detection outputs of the scan code generation software routine 24 shown in FIGS. 1 and 2, Lock Detect State Machine 501 of FIG. 11 uses analogous scan code detection in the form of 'lock code' signals 321, 322, and 323 already described.

Secondly, all of the state transitions of FIG. 11 are qualified with the END_SCAN_CODE signal 510. Since END_SCAN_CODE signal 510 only goes active for one 100 KHz clock period after SCAN_CODE_EN signal 131 goes inactive, this serves to ensure that each state transition is associated with a single scan code transmission, remembering that scan code decodes 321, 322, and 323 remain valid after the actual scan code transmission is complete.

Thirdly, whereas in Key Lock Detection State Machine 41 of FIG. 3 the fall-back transitions from states 'Ctl', 'Ctl/Alt', 'Alt', and 'Alt/Ctl', i.e., all the transitions that were not progressing towards the 'Key Lock Det' state, proceed directly back to the 'Idle' state, Lock Detect State Machine 501 of FIG. 11 remains in the 'Wait 2$^{nd}$' state until END_SCAN_CODE signal 510 goes active before proceeding back to the 'Idle' state. Since each occurrence of END_SCAN_CODE signal 510 represents a single scan code transmission, the 'Wait 2$^{nd}$' state forces Lock Detect State Machine 501 of FIG. 11 to wait one additional scan code transmissions after a fall-back event before being allowed to begin a new key combination detection sequence. This is necessary since the scan code transmitted by the keyboard when either the 'Ctrl' or 'Alt' keys are lifted, i.e., the 'break' code, consists of two separately transmitted bytes, the second of which is identical to the scan code sent when the key is depressed, i.e., the 'make' code. Thus, without the intermediary 'Wait 2$^{nd}$' state Lock Detect State Machine 501 would transition back to the 'Idle' state on the first byte of the two-byte 'break' scan code, then would transition again to either the 'Ctl' or 'Alt' states since MAKE_CTL signal 321 or MAKE_ALT signal 322 would again become active due to the second scan code byte which, as was just explained, is identical to that of the depressed-key scan code. This intermediary 'Wait 2$^{nd}$' state is not necessary in the first preferred embodiment since the scan code generation software routine 24 performs a complete 'break' decode of the two-byte scan code transmission.

Whereas the first preferred embodiment used Keyboard Disable State Machine 42 shown previously in FIG. 3 to track the keyboard enabled/disabled mode, the alternate preferred embodiment uses the toggle flop 114 shown in FIG. 5 for the same purpose; each time Lock Detect State Machine 501 of the alternate preferred embodiment shown in FIG. 11 passes through the 'Lock Det' state LOCK_DET signal 133 goes active for one clock period causing toggle flop 114 shown in FIG. 5 to change state, which, as has already been explained, changes the enabled/disabled passage of keyboard clock and data signals 122 and 123 respectively.

CONCLUSION, RAMIFICATIONS, AND SCOPE

Accordingly, the reader will see that the keyboard locking methods of this invention are easy to apply to existing keyboard forms and extremely easy to activate in practice. For example, a keyboard manufacturer could incorporate the first preferred embodiment into existing products by simply loading new software into the keyboard micro-processor ROM, while a computer user could add the keyboard locking method to an existing keyboard by simply adding an extension cable to the keyboard. In both embodiments the keyboard can be disabled and re-activated with a simple, single motion of the hands.

Although the preferred embodiments just described assume certain specific industry equipment and associated interfaces it will be obvious to one practiced in the art that similar techniques as those described could be applied to other computer-based systems. For example, although the alternate preferred embodiment operates with IBM-compatible PC computers, it will be understood by one skilled in the art that similar techniques as those described here could be applied to other types of computers, e.g., Apple PCs, Sun workstations.

I claim:

1. In a computer system that includes a central processing unit and a keyboard for entry of user information, a keyboard lock that is inserted between said computer central processing unit and said computer keyboard, and that controllably enables said keyboard's communication of depressed keys, said keyboard lock comprising:
    (a) central processing unit electrical buffer to controllably enable said central processing unit's communications to said keyboard, said central processing unit electrical buffer enabled when said keyboard's communications are not occurring;
    (b) lock control circuitry that monitors said keyboard's communications to detect:
        (1) key communications resulting from depressed keys of said keyboard,
        (2) response communications resulting from said keyboard's response to said central processing unit's communications,
        (3) a predetermined first and second combination of depressed keys of said keyboard;
    (c) keyboard electrical buffer to controllably enable said keyboard's communications to said central processing unit, said keyboard electrical buffer disabled for said key communications after said lock control circuitry detects said first combination of depressed keys and enabled for all manner of said keyboard's communications after said lock control circuitry detects said second combination of depressed keys;
whereby a user can prevent unintended entry of information into said computer system by using said combinations of depressed keys to alternately enable and disable said keyboard's communications of depressed keys to said central processing unit.

2. A keyboard lock according to claim 1, wherein:
    said second combination of keys is the same as said first combination of keys, whereby a user of said computer system can alternately disable and enable said keyboard's communications of depressed keys by depressing the same combination of said keyboard's keys.

3. A keyboard lock according to claim 1, wherein:
    said central processing unit electrical buffer enables said central processing unit's communications to said keyboard when said keyboard's communications are not occurring and additionally only during said central processing unit's communications.

4. A keyboard lock according to claim 1, wherein:
    said central processing unit electrical buffer, said lock control circuitry, and said keyboard electrical buffer are housed together along with:
    (1) a cable connector for mating with said keyboard's cable, and
    (2) a cable for connecting to said computer system's keyboard interface connector,
whereby a user of said computer system can easily insert said keyboard lock between said computer central processing unit and said keyboard.

5. A keyboard lock according to claim 1, wherein:
    said central processing unit electrical buffer, said lock control circuitry, and said keyboard electrical buffer all are powered from powering voltage provided by said computer system on said computer system's keyboard interface.

6. In a computer system that includes a central processing unit and a keyboard for entry of user information, a keyboard lock apparatus that is inserted between said keyboard and said computer central processing unit for controllably enabling said keyboard's communication of depressed keys, said keyboard lock apparatus comprising:
    (a) mode control means to monitor said keyboard's communications and said central processing unit's communications and to detect:
        (1) key communications resulting from depressed keys of said keyboard,
        (2) response communications resulting from said keyboard's response to said central processing unit's communications;
    (b) lock detect means for detecting a predetermined first and second combination of depressed keys of said keyboard;
    (c) central processing unit buffer means controlled by said mode control means to enable said central processing unit's communications to said keyboard when said keyboard's communications are not occurring;
    (d) keyboard buffer means controlled by said mode control means and said lock detect means to:
        (1) disable said key communications to said central processing unit while still enabling said response communications after said lock control means detects said first combination of depressed keys, and
        (2) enable all manner of said keyboard's communications after said lock detect means detects said second combination of depressed keys;
whereby a user can prevent unintended entry of information into said computer system by using said combinations of depressed keys to alternately enable and disable said keyboard's communications of depressed keys to said central processing unit.

7. A keyboard lock apparatus according to claim 6, wherein:
    said second combination of keys is the same as said first combination of keys, whereby a user of said computer system can alternately disable and enable said keyboard's communications of depressed keys by depressing the same combination of said keyboard's keys.

8. A keyboard lock apparatus according to claim 6, wherein:
    said mode control means controls said central processing unit buffer means to enable said central processing unit's communications to said keyboard when said keyboard's communications are not occurring and additionally only during said central processing unit's communications.

9. A keyboard lock apparatus according to claim 6, wherein:
    said keyboard lock apparatus is housed together with:
    (1) a cable connector for mating with said keyboard's cable, and
    (2) a cable for connecting to said computer system's keyboard interface connector, whereby a user of said computer system can easily insert said keyboard lock between said computer central processing unit and said keyboard.

10. A keyboard lock apparatus according to claim 6, wherein:
    said keyboard lock apparatus is powered from powering voltage provided by said computer system on said computer system's keyboard interface.

* * * * *